(No Model.)
J. MOSS.
HOUSE SERVICE AND STREET WASHER CONNECTION.
No. 336,253. Patented Feb. 16, 1886.
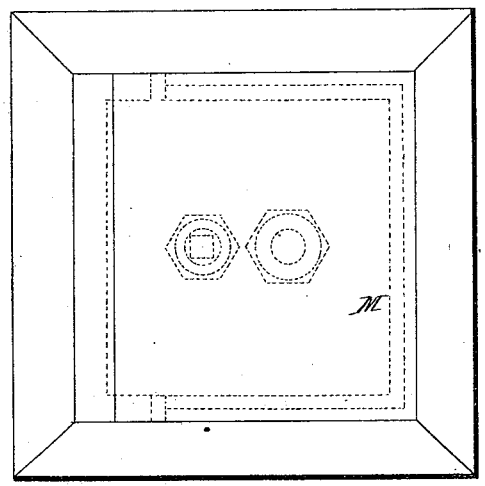
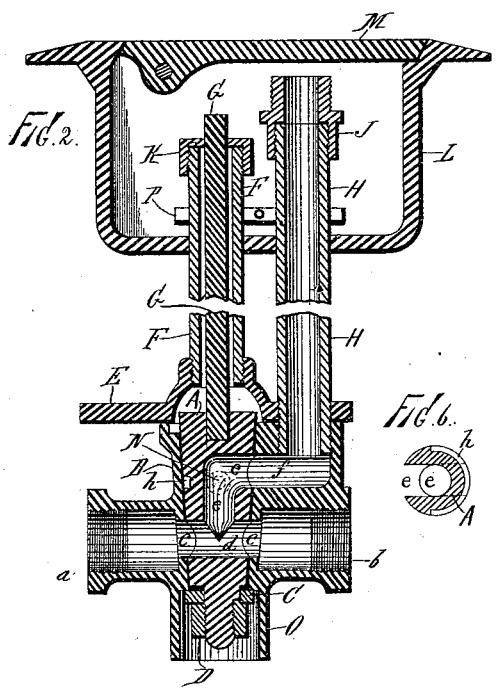
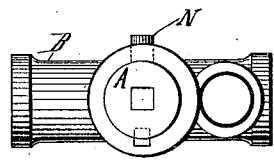
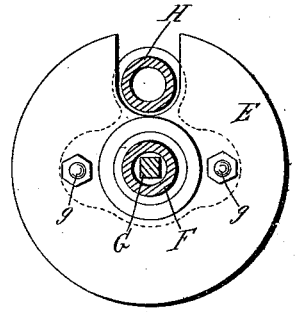
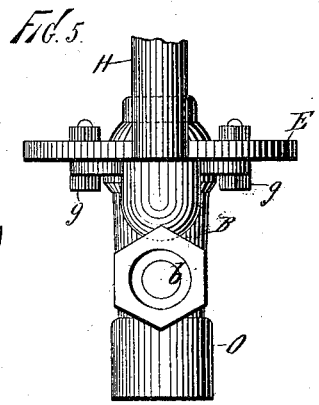
Witnesses:
John Buckler
L. H. Osgood
John Moss,
Inventor
By Worth Osgood,
Attorney.

UNITED STATES PATENT OFFICE.

JOHN MOSS, OF BROOKLYN, NEW YORK.

HOUSE-SERVICE AND STREET-WASHER CONNECTION.

SPECIFICATION forming part of Letters Patent No. 336,253, dated February 16, 1886.

Application filed July 10, 1885. Serial No. 171,160. (No model.)

*To all whom it may concern:*

Be it known that I, JOHN MOSS, of Brooklyn, in the county of Kings and State of New York, have invented certain new and useful Improvements in House-Service and Street-Washer Connections, of which the following is a full, clear, and exact description, reference being had to the accompanying drawings, and to the letters of reference marked thereon.

My invention has relation to that class of devices employed, in connection with water-service pipes, for the purpose of governing or permitting the flow of water to the house and to the surface of the street or sidewalk.

Among the objects of my invention are the production of a simple, cheap, and durable cock or valve for regulating or controlling the flow of water, which cock may be easily and cheaply made and operated, and not liable to get out of order, and to provide simple and efficient means for protecting the plug against damage from the exterior, and for insuring the whole device against damage or disarrangement by movements caused by frost.

To accomplish all of this my improvements involve certain new and useful peculiarities of construction and relative arrangements or combinations of parts, as will be herein first fully described, and then pointed out in the claims.

In the accompanying drawings, forming part of this specification, Figure 1 is a plan or top view of the washer-box. Fig. 2 is a vertical sectional elevation showing the apparatus complete, the central part being broken out to indicate that the vertical pipes and rod may be of any desired length. Fig. 3 is a plan view of the cock, omitting the cover and other connections. Fig. 4 is a horizontal section and plan view, and Fig. 5 an elevation upon a plane at right angles to that of Fig. 2, showing the cock and the cover mounted thereon. Figs. 6 and 7 are sectional views through the plug, indicating different positions to which the same may be turned.

In all these figures like letters of reference, wherever they occur, indicate corresponding parts.

A is the plug, made of brass or other suitable metal, the same being seated in a casing or shell, B, and together therewith constituting the cock, by which the flow of water is regulated or cut off. At $a$ and $b$ the casing is fitted to be coupled with pipes in any suitable manner, the inlet for water from the main being at $a$ and the pipe leading to the house being attached at $b$. A straight channel, $c\ c$, through the valve-seat establishes communication between the ports at $a$ and $b$ when the plug is turned, as in Fig. 2, so as to bring the channel $d$ therein in line with $c\ c$. The plug A has also a channel or passage, $e\ e$, communicating with $d$, and with another channel, $f$, formed in an enlargement of the casing. The discharge-pipe H, leading to the washer-box, for the purpose of carrying water to the street, is connected with the casing B, so as to communicate with channel $f$.

When the plug is turned to the position indicated in Fig. 2, water flows through $d$ to the house, and also up through $e$ and $f$ and H to the street. By turning the plug a half-revolution, or reversing its position from that of Fig. 2, the channel $d$ will still communicate through $c\ c$ with $a$ and $b$, thus allowing the water to flow to the house, but the channel $e$ will be closed, and the water therefore cut off from the street. This position of the plug is indicated in Fig. 6. In Fig. 7 the plug is shown as having been turned a quarter of a revolution, in which position the channel $c\ c$ is closed and the water cut off from both the street and the house. Thus the valve or cock is adapted for all the desired conditions of service. Regulation of the flow of water is accomplished by varying the position of the plug.

The cock is located at a distance below the surface of the street or sidewalk, and the earth surrounding it is subjected to disturbances from the action of frost.

To prevent any damage to the lower end of the plug and to keep earth and stones from contact therewith, I provide the casing with a tubular projection, O, which I call a "guard," the same containing or surrounding the nut D upon the end of the plug, and the washer C, by which a tight seating is effected, the guard operating to protect these parts from damage in a manner which will be readily understood. This guard is cast with the shell or casing, and is open at bottom, so as to afford access to the nut upon the end of the plug.

Over the cock is a disk or cover, (represented at E,) the same being secured in place upon the casing by suitable bolts and nuts, as at g g. This affords an extended bearing upon or against the surrounding earth, and operates to counteract to a great extent any tendency of the earth to lift or otherwise move the cock. The pipe H passes through this cover, and the guard-pipe F enters an opening in the top thereof and serves as a guard for the turning-rod G, by which the plug A is moved in its seat.

The washer box L is made amply deep, so as to admit of any probable vertical movements of the pipes H and F therein, the pipes passing loosely through the bottom. The box L may move upon the pipes, or the pipes move independently of the box, without seriously disturbing the complete apparatus.

P is any simple form of guide employed to steady F and H within box L.

M is the cover for box L.

K is a cap-nut, which may be applied upon the top of pipe F to steady rod G, and J is a hose-connection applied upon H.

The plug A is supplied with a recess, (represented at $h$,) and the casing has a drip-nozzle, N, on one side. (Shown in dotted lines, Fig. 2.) This recess $h$ extends only partly around the plug, and it is located therein, so as to drain the horizontal channel $f$, with which it communicates when the plug is properly turned.

When the water is shut off from the street-pipe H, the channel or recess $h$ drains the water from pipe H to the exterior of the cock through nozzle N. This drainage may, if desired, be conducted away from the vicinity of the cock by attaching a drain-pipe to N, or by other suitable means. When the water is turned onto pipe H, the channel $h$ is closed.

Being constructed and arranged for operation as above explained, the cock is composed of few and simple parts, the channels are all easy to make, and the apparatus well calculated to answer the purposes or objects of the invention, as previously set forth.

Having now fully described my invention, what I claim as new, and desire to secure by Letters Patent, is—

1. In a device of the character herein set forth, the combination, with the shell or casing containing the revolving plug and having the water-ways, as explained, and the guard-disk E, applied upon said casing, of the tubular guard O, formed integrally with the casing, said guard being open at bottom and arranged to protect the projecting end of the plug and to afford access thereto, substantially as shown and described.

2. In a device of the character herein set forth, the combination, with the casing B, containing the plug and the water-ways, of the removable guard plate or disk E, secured upon the top of the casing, as by bolts $g$, projecting beyond the casing and perforated to receive pipes F H and rod G, the pipe F being threaded into the disk, substantially as shown and described.

3. The combination, with the water-pipe H and independent guard-pipe F, of the guard-plate E and box L, the plate E being removably connected with the plug-casing and threaded upon the lower end of the guard-pipe, and the box L being made movable upon both pipes at top, substantially as shown and described.

In testimony that I claim the foregoing I have hereunto set my hand in the presence of two witnesses.

JOHN MOSS.

Witnesses:
JOHN BUCKLER,
WM. E. STILLINGS.